United States Patent [19]

Lewis, Jr.

[11] Patent Number: 4,684,283
[45] Date of Patent: Aug. 4, 1987

[54] HANDLE SOCKET ADAPTER

[75] Inventor: John C. Lewis, Jr., Salisbury, Vt.

[73] Assignee: The Drackett Company, Cincinnati, Ohio

[21] Appl. No.: 877,573

[22] Filed: Jun. 23, 1986

[51] Int. Cl.⁴ ............... F16B 9/00; F16L 41/00
[52] U.S. Cl. .................... 403/299; 403/263;
403/343; 403/287; 403/189; 403/361; 15/143 R
[58] Field of Search ............ 403/299, 192, 194, 198,
403/287, 301, 343, 361, 263, 296, 406.1, 342;
15/145, 143 R

[56]  References Cited
U.S. PATENT DOCUMENTS

| | | | |
|---|---|---|---|
| 1,997,297 | 4/1935 | Fuchs | 403/301 X |
| 2,099,450 | 11/1937 | Meyer | 403/263 X |
| 2,834,625 | 5/1958 | Stanley et al. | 403/343 |
| 3,076,217 | 2/1963 | Scholl | 403/343 X |
| 3,524,210 | 8/1970 | Mclean | 403/343 X |
| 3,682,516 | 8/1972 | Savage | 15/145 X |
| 3,762,753 | 10/1973 | Yulkowski | 403/361 X |
| 4,003,668 | 1/1977 | Kelly, III et al. | 403/299 X |
| 4,157,598 | 6/1979 | Talent et al. | 403/296 X |
| 4,191,486 | 3/1980 | Pelton | 403/296 X |
| 4,194,852 | 3/1980 | Cupp et al. | 403/299 |
| 4,371,282 | 2/1983 | Sturm | 403/299 X |
| 4,373,828 | 2/1983 | Sartori | 403/263 |
| 4,384,383 | 5/1983 | Bryant . | |
| 4,433,931 | 2/1984 | Malish et al. | 403/194 |
| 4,486,913 | 12/1984 | Kubick . | |
| 4,541,139 | 9/1985 | Jones et al. | 15/145 |
| 4,642,837 | 2/1987 | Nichols et al. | 403/342 X |

FOREIGN PATENT DOCUMENTS 2058265  4/1981  United Kingdom .............. 403/301

Primary Examiner—Cornelius J. Husar
Assistant Examiner—Todd G. Williams
Attorney, Agent, or Firm—Gene Warzecha

[57]  ABSTRACT

A socket adapter for use with a broom block, the socket adapter for receiving a threaded handle such that the release torque required to remove the handle is aggrandized, i.e. greater than the application torque required to attach the handle. The socket adapter comprises a tube having an annular lip for abutting against a corresponding lip adjacent the threads of the handle and at least one thread on the tube. The thread begins a predetermined distance below the annular lip such that an expansion space is formed above the thread to provide a space into which the handle thread material may expand. Upon tightening the handle in the socket adapter with a predetermined amount of attachment torque, the handle material will expand into the expansion space and create an attachment between the handle and the socket requiring a release torque greater than the attachment torque to remove the handle.

6 Claims, 5 Drawing Figures

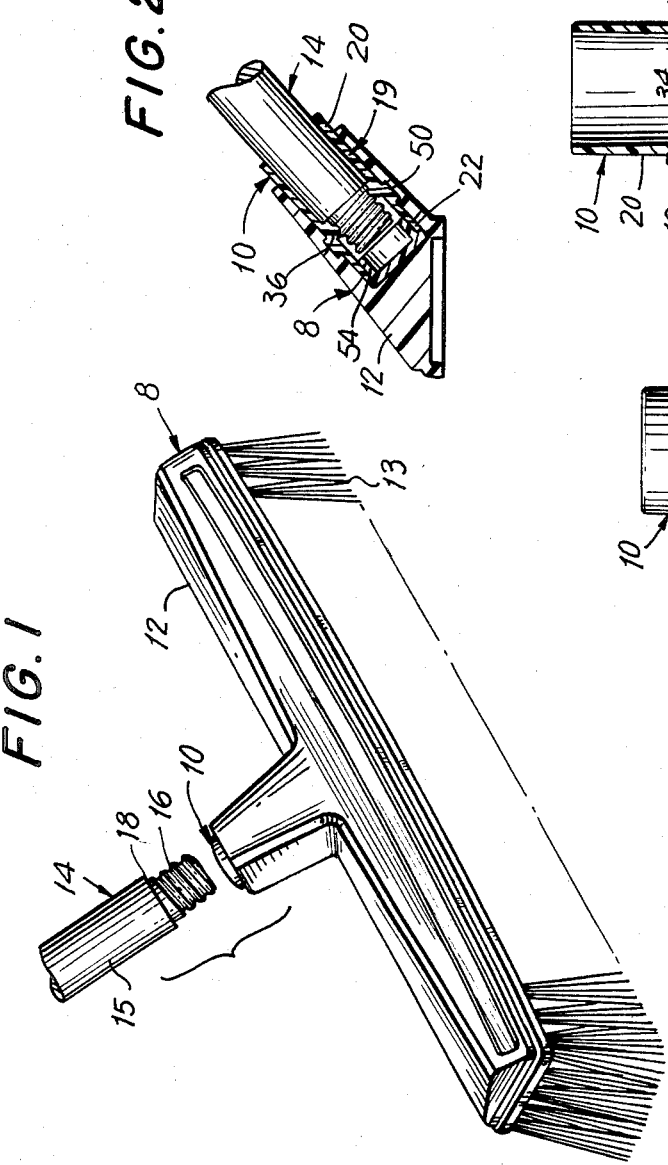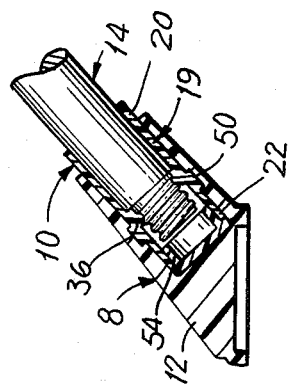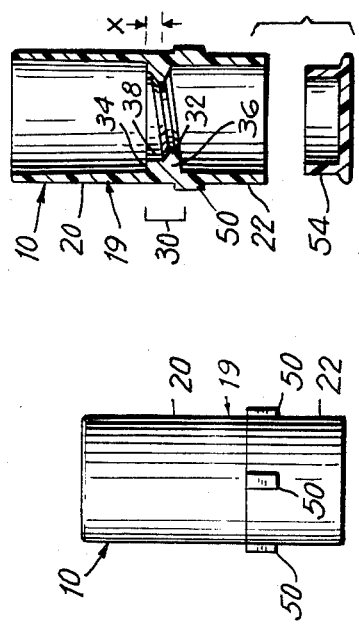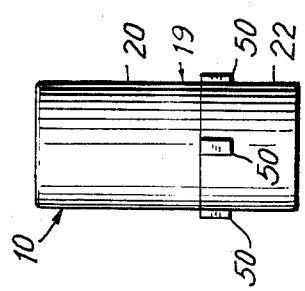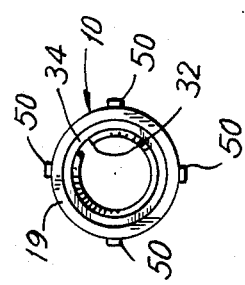

HANDLE SOCKET ADAPTER

BACKGROUND OF THE INVENTION

1. Field of the Invention

The invention relates generally to means for attaching handles to appliances, brooms or other handle goods. More particularly, the invention relates to means for threadably attaching a handle to a molded broom such that the torque required to remove the handle is greater than the torque required to attach the handle.

2. Description of the Prior Art

It will be obvious even to those not skilled in the art that threaded handles are a common and convenient way of utilizing a variety of devices including brooms, mops, etc. It is common for handles to be made of a variety of materials and to be attached to a variety of objects by forming male threads in the handles which are threadably engaged with sockets having complementary female threads in a portion of the object. For example, it is well known to threadably attach a handle to a broom block or cover into which are set the broom bristles. Generally, broom blocks are first formed of a suitable material and then handle sockets must be drilled and threaded to enable the attachment of a conventional threaded handle.

A common problem with brooms and other objects using conventional threaded handles is that, upon being subjected to the stresses of use, the handle tends to loosen in the socket. If the handle is not somehow secured relative to the broom block, this necessitates the handle being repeatedly re-tightened and over an extended period of time the threads on either the handle or the socket tend to become worn. This results in gradual loosening of the fit between the handle and the broom and leads eventually to the need to replace either the handle or the entire broom.

In attaching a threaded handle to a broom block, for example, a predetermined amount of application torque must be applied to suitably tighten the handle. To loosen the handle, a predetermined amount of release torque is necessary. In most prior art designs not having an auxiliary bracket or other positive reinforcement the release torque is equal to or less than the application torque. This results primarily from the normal operation of threadably engaging relatively soft goods. That is, the act of engagement necessarily wears away some of the surface of the male and/or female threads, thus decreasing the friction inherent in the fit.

Prior art constructions do not generally suggest ways to make the release torque greater than the application torque other than to use auxiliary devices such as straps, etc. However, U.S. Pat. No. 4,486,913 (Kubick) does suggest one way of achieving this through the use of a tapered handle end, threaded at the tip and inserted into a complementarily shaped bore in a molded brush block. The Kubick patent, however, requires a complex and costly manufacturing process in order to achieve the desired goals. The brush block must first be molded and then drilled appropriately to provide the aperture for the handle, or it must initially be molded with the aperture. Either approach requires unnecessary extra steps and expense. Additionally, the handle must be tapered and threaded thus making it different from a standard non-tapered handle configuration. It should be obvious to those of ordinary skill in the art that manufacturing costs can always be minimized with the use of standard—not custom made—components.

U.S. Pat. No. 4,384,383 (Bryant) discloses another means of attaching a handle to a molded broom block. The Bryant patent does not require a handle tapered to the same extent as the Kubick patent, but it does require a uniquely shaped handle having a tapered seat between the threaded end of the handle and the body of the handle. Additionally, the Bryant and Kubick patents also suffer from the disadvantage that the material into which the female threads are formed is the same material from which the broom block is formed (e.g. rigid polypropylene foam). A problem associated with molded blocks is that the material desired for molding the block (i.e. polypropylene or polyethylene or other suitable polymer) is often not the most desirable material into which to form female threads for receiving the handle.

It is known in the prior art to utilize separate, threaded socket adapters which may be interposed between a threaded handle and a broom block. One such socket adapter is termed a "handle nut" and is shown in U.S. Pat. No. 3,076,217 (Scholl). The handle nut is made of a plastic, not excessively resilient material and is secured (by cement, etc.) to a brush head. A plurality of threads are provided in the nut to enable a non-threaded, smooth tapered handle to be threadably engaged to the nut, thereby forming threads in the handle. Use of a similar handle nut may be possible with molded broom blocks, however, the process for molding such multi-thread pieces requires multi-action type molds and is therefore relatively complex and costly.

In view of the foregoing, it is an object of this invention to provide a socket adapter for a molded broom which adapter may be easily and inexpensively manufactured.

It is a further object of this invention to provide a means for attaching a standard threaded handle to a molded broom block.

It is yet another object of this invention to produce a socket adapter to receive a threaded handle such that the application torque with which the handle is threaded into the socket is less than the release torque required to remove the handle from the socket.

SUMMARY OF THE INVENTION

These and other objects of the invention are achieved by the preferred embodiment thereof which comprises a socket adapter for use with a broom block and a threaded handle, the handle having an annular surface interposed between a threaded end and the body of the handle. The socket adapter comprises a tubular body having an internal surface with a predetermined inside diameter; an annular thread base axially aligned with said internal surface and interposed between the ends of said tubular body, said thread base having an annular ledge adapted to be contiguous to at least a portion of said annular surface when said handle is threadably engaged within said socket adapter; at least one thread secured to said thread base, said thread beginning at a predetermined distance away from said annular ledge and adapted to engage said threaded end of said handle.

Since the socket adapter has only a single thread, it is injection moldable in conventional "clamshell" molding equipment. Prior to use by being molded into a broom block, an end cap may be inserted into one end of the socket adapter to prevent material flow into the adapter during broom block molding.

BRIEF DESCRIPTION OF THE DRAWINGS

FIG. 1 shows a first perspective view of a push broom having a molded broom block and a socket adapter constructed in accordance with the principles of this invention.

FIG. 2 shows a cross-sectional side elevational view of FIG. 1 taken transversely through the center thereof and eliminating the bristles for clarity.

FIG. 3 shows an exploded elevational view of the socket adapter shown in FIG. 2.

FIG. 4 shows a top plan view of FIG. 3.

FIG. 5 shows a front elevational view of the broom fitment showing the external surface thereof.

DESCRIPTION OF THE PREFERRED EMBODIMENT

Referring now to FIG. 1, there is shown a front perspective view of a broom 8 utilizing a broom fitment or socket adapter 10. Broom 8 comprises a broom block 12 molded from, for example, polypropylene to which are attached bristles 13 and into which socket adapter 10 is molded during the manufacture thereof. Socket adapter 10 is intended to receive handle 14 which has a body 15 and threads 16 adjacent to annular lip 18.

As best seen in FIGS. 2 and 3, socket adapter 10 includes a tubular body 19 having an upper portion 20 having a generally cylindrical internal cross-section with an inside diameter only slightly greater than the diameter of the body 15 of handle 14. Upper portion 20 is aligned axially with lower portion 22 and is, in the preferred embodiment, integrally formed therewith. Intermediate upper and lower portions is a thread portion 30 having a female thread 32 intended to receive the male threads of handle 14. Thread portion 30 includes an annular ledge 34 situated at the bottom of upper portion 20. Thread portion 30 may be considered as being formed of an annular thread base 36 having an inside diameter less than that of upper portion 20. Female thread 32 is molded on the inside surface of thread base 36, the thread beginning at a point a predetermined distance "X" below annular ledge 34. The distance "X" may be on the order of 0.010" to 0.55". As best seen in FIG. 4, thread 32 extends less than 360° about internal surface of thread base 36 in order to facilitate the molding of socket adapter 10 in a relatively simple and inexpensive single action clamshell type mold. The space between annular ledge 34 and the top surface of thread 32 is an expansion space 38 which provides the area into which the thread material may expand, as will be more fully explained below. Because of the advantages of the invention, it has been found unnecessary to provide more than a single thread 32.

While only a single female thread 32 is necessary in the operation of the invention, lower portion 22 is required to receive, but not to engage, the threads 16. Lower portion 22 may be tapered along its inside surface, if desired.

The exterior surface of socket adapter 10 is provided with lugs 50 for securing the adapter within broom block 12. It will be understood that these lugs enhance the connection between the adapter and the block.

Circular end cap 54 may be utilized, if desired, to prevent material flow into lower portion 22 during the molding of block 12. Cap 54 may be made integral with body 19 but this would require a more complex molding operation and defeat some of the advantages offered by this invention.

In the operation of socket adapter 10, handle 14 is threadably inserted in order to engage male threads 16 with female thread 32. It will be noted that annular lip 18 of handle 14 will abut annular ledge 34, thus limiting further downward travel of handle 14. At this point, continued rotation of handle 14 up to a predetermined amount of application torque will result in a compression force being exerted within expansion space 38 upon that portion of the handle between annular ledge 34 and female thread 32. This results in an expansion of the handle thread material in this area and serves to enhance the strength of the attachment between the broom and the handle. It will be noted that, because of expansion space 38, once this predetermined amount of application torque is applied the release torque necessary to unthread the handle is greater than the application torque.

It has been found that the invention operates as described provided that the material from which the socket is manufactured is harder than the material of the handle. In the preferred embodiment, the socket adapter is manufactured from nylon and the handle and its threads are made of wood.

It will be understood by those skilled in the art that numerous improvements and modifications may be made to the preferred embodiment of the invention disclosed herein without departing from the spirit and scope thereof.

What is claimed is:

1. A socket adapter for threadably receiving a handle having a body and a thread end and a substantially transverse annular surface interposed between said threaded end and said body, said socket adapter comprising:
   a tubular body having an internal surface with a predetermined inside diameter;
   an annular thread base axially aligned with said internal surface and interposed between the ends of said tubular body, said thread base having a substantially transverse annular ledge adapted to be contiguous to at least a portion of said annular surface when said handle is threadably engaged within said socket adapter; and
   a single, non-deformable thread secured to said thread base, said thread beginning a predetermined distance away from said annular ledge, subtending an arc of less than 360° and adapted to engage said threaded end of said handle.

2. A socket adapter for threadably receiving a handle having a body and a threaded end and a substantially transverse annular surface interposed between said threaded end and said body, said socket adapter comprising:
   a first tubular body having an internal surface with a first predetermined inside diameter;
   a second tubular body having an internal surface with a second predetermined inside diameter, said second tubular body axially aligned with said first tubular body;
   an annular thread base axially aligned intermediate said first and second tubular bodies, said thread base having an annular ledge adapted to be contiguous to at least a portion of said annular surface when said handle is threadably engaged within said socket adapter; and
   a single, non-deformable thread secured to said thread base, said thread beginning a predetermined distance from said annular ledge and subtending an arc of less than 360°.

3. A socket adapter according to claims 1 or 2 wherein all components of said socket adapter are manufactured form nylon and aid threaded end is solid and formed from wood.

4. A socket adapter according to claim 1 further comprising an end cap for sealing one end of said tubular body.

5. A socket adapter according to claim 1 further comprising means secured to the exterior of said tubular body for securing same within a broom block.

6. A socket adapter according to claim 5 wherein said means for securing comprises a plurality of rectilinear protrusions radially extending from the external surface of said tubular body.

* * * * *